United States Patent
Lekeux et al.

(12) 
(10) Patent No.: US 6,191,512 B1
(45) Date of Patent: Feb. 20, 2001

(54) ELECTRIC MOTOR FOR ACTUATING A FUNCTIONAL UNIT OF A VEHICLE

(75) Inventors: Jean Pierre Lekeux, Clecy; François Breynaert, Coeu, both of (FR)

(73) Assignee: Meritor Light Vehicle Systems-France (FR)

( * ) Notice: Under 35 U.S.C. 154(b), the term of this patent shall be extended for 0 days.

(21) Appl. No.: 09/274,514

(22) Filed: Mar. 23, 1999

(30) Foreign Application Priority Data

Mar. 26, 1998 (FR) .................................................. 9803769

(51) Int. Cl.$^7$ ...................................................... H02K 5/00
(52) U.S. Cl. ................................ 310/89; 310/71; 310/85; 310/91; 310/43
(58) Field of Search ................................. 310/89, 90, 91

(56) References Cited

U.S. PATENT DOCUMENTS

| | | | |
|---|---|---|---|
| 4,164,670 | * 8/1979 | Maher | 310/50 |
| 4,698,542 | * 10/1987 | Muller | 310/67 R |
| 5,004,942 | * 4/1991 | King | 310/89 |
| 5,196,747 | * 3/1993 | Kress et al. | 310/89 |
| 5,245,237 | * 9/1993 | Fisher et al. | 310/89 |
| 5,614,775 | * 3/1997 | Horski et al. | 310/68 R |
| 5,616,975 | * 4/1997 | May et al. | 310/89 |

FOREIGN PATENT DOCUMENTS

| | | | |
|---|---|---|---|
| 0462169B1 | 3/1990 | (EP) | 310/89 |
| 0482040B1 | 1/1991 | (EP) | 310/89 |

OTHER PUBLICATIONS

French Search Report dated Dec. 14, 1998 for French Application No. 9803769.

* cited by examiner

*Primary Examiner*—Elvin Enad
(74) *Attorney, Agent, or Firm*—Carlson, Gaskey & Olds

(57) ABSTRACT

A motor including a motor unit (2) has at least one plastics material portion (4). A two-part casing (5) receives at least one electronic circuit card. The casing is formed of two complementary portions (5a, 5b) joining on a plane (P) passing through a diagonal plane of the casing and provided with means (7) to receive the circuit card and complementary fixing means (9, 10, 11). One portion (5a) of the casing is in one piece with the plastics material (4) of the motor unit and the other portion (5b) includes an envelope (8) for a connector for connecting the motor to the remainder of the circuits of the vehicle.

17 Claims, 1 Drawing Sheet

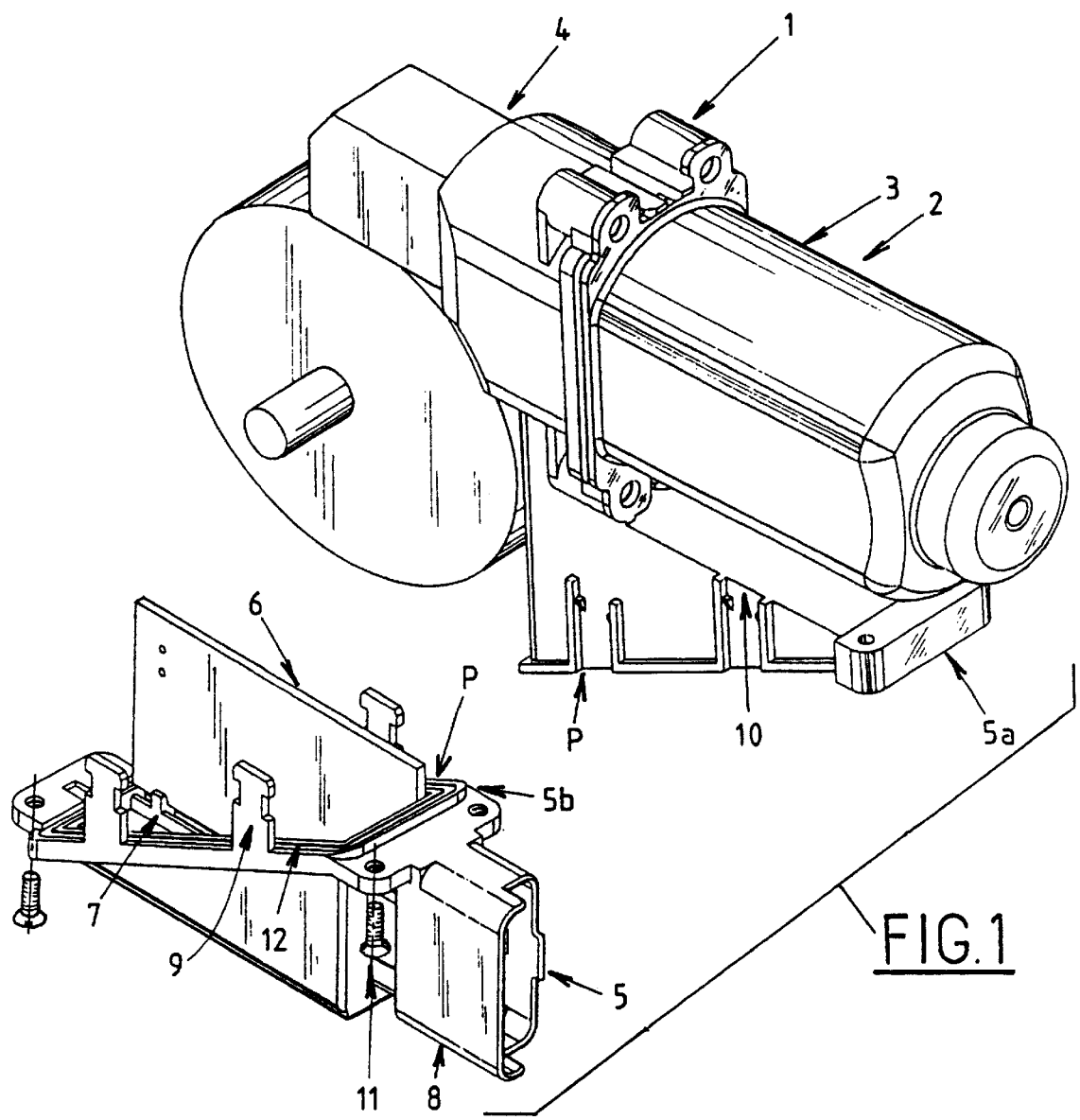
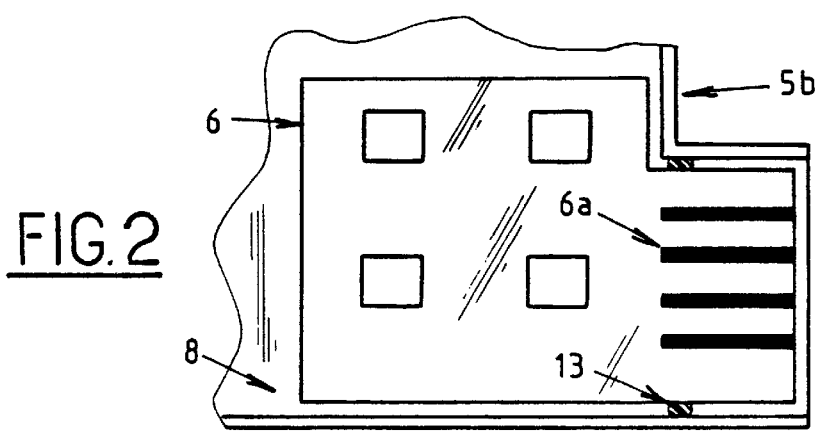

ELECTRIC MOTOR FOR ACTUATING A FUNCTIONAL UNIT OF A VEHICLE

BACKGROUND OF THE INVENTION

The present invention concerns an electric motor for actuating a functional unit of a motor vehicle. The invention is more particularly concerned with an electric motor of the type including a motor unit having at least one plastics material portion.

Electric motors of this type are used to drive functional units of motor vehicles such as adjustors for seats, windows, etc., for example. Such actuator motors are frequently associated with electronic circuits that supply power to the motors and monitor their operation to improve their safety.

For example, anti-pinching functions have been associated with gear motors for actuating vehicle window closing mechanisms in particular.

The increasing integration of electronic circuits into vehicles is also giving rise to a number of problems, in particular with regard to their location.

SUMMARY OF THE INVENTION

The aim of this invention is therefore to provide a motor of the above type that can easily be associated with electronic circuits.

To this end, the invention consists in an electric motor for actuating a functional unit of a motor vehicle, of the type including a motor unit comprising at least one plastics material portion. The motor unit includes a two-part casing for receiving at least one electronic circuit card. The casing preferably is formed of two complementary portions joining on a plane passing through a diagonal plane of the casing and provided with means for receiving the card and complementary fixing means. One portion of the casing is in one piece with the plastics material portion of the motor unit and the other portion of the casing includes an envelope for a connector for connecting the motor to the remainder of the circuits of the vehicle.

The invention will be better understood from the following description, which is given by way of example and with reference to the accompany drawings.

BRIEF DESCRIPTION OF THE DRAWINGS

FIG. 1 is a diagrammatic exploded view of one embodiment of an electric motor designed in accordance with this invention.

FIG. 2 is a detail view showing a portion of the connection of the motor to the remainder of the circuits of the vehicle.

DETAILED DESCRIPTION OF THE PREFERRED EMBODIMENT

The figures show an electric motor 1 for actuating a functional unit of a motor vehicle such as a seat adjustor or window raising mechanism.

A motor of the above kind conventionally includes a motor unit 2 comprising a metal casing 3 and at least one plastics material portion 4 forming a casing receiving a gear mechanism of the motor.

In the prior art, mechanisms for reducing the rotation speed of the output shaft of the motor are disposed between the shaft and the functional unit that is to be actuated and these mechanisms are housed in plastics material casings.

In accordance with this invention, a parallelepiped-shaped casing 5 for receiving at least one electronic circuit card is provided along the motor unit 2 and is formed of two complementary portions 5a and 5b joining on a plane P passing through a diagonal plane of the casing.

These complementary portions of the casing are provided with means 7 for receiving one or more electronic circuit cards 6 and complementary fixing means described in more detail below.

The portion 5A of the casing 5 preferably is in one piece or integrally formed with the plastics material portion 4 of the motor unit 2. The other portion 5b preferably includes an envelope 8 for the connector for connecting the motor to the remaining circuits of the vehicle.

The means 7 receiving the electronic circuit card 6 can be slides or pins or any other means for centering and fixing cards of this type into the casing 5.

The complementary fixing means for fixing the two portions 5a and 5b of the casing 5 to each other can include complementary spring clip means comprising hooks. One hook 9 is shown in FIG. 1 and is in one piece or integrally molded with the casing portion 5b. The hook 9 is adapted to cooperate with the complementary abutment means 10 on the other portion 5a of the casing 5.

The fixing means can equally comprise fasteners or screws 11 for screwing the portions of the casing together.

A gasket 12 preferably is provided between the two portions 5a, 5b of the casing 5. The gasket seal 12 preferably is received in a corresponding groove in one of the casing portions, here the portion 5b.

The electronic circuit card 6 can have a connection portion 6a designed to project into the envelope 8 of the connector of the corresponding portion 5b of the casing, as shown in FIG. 2. Sealing means 3 preferably is provided between the connector envelope 8 and this portion 6a of the card 6. Of course, the sealing means could be carried by a complementary connector on the wiring harness of the vehicle, adapted to fit in the connector envelope 8, to provide a seal between that envelope and the connector on the wiring harness of the vehicle.

It goes without saying that although in the embodiment described the envelope 8 of the casing portion 5b is on one of its sides, the envelope could be on its end wall, for example.

Clearly, a structure designed according to this invention has a number of advantages, in particular its simplicity and the wide capacity of adapting it to different motor power supply and connection configurations. Moreover, inserting the electronic circuit cards into the casing 5 is extremely simple because of the particular shape of its portions 5a, 5b. A good seal is assured between the portions of the casing and the means connecting it to the remainder of the circuits of the vehicle.

Of course, other embodiments are feasible. Variations and modifications may become apparent to those skilled in the art that do not depart from the basis of this invention. The scope of legal protection for this invention can only be determined by studying the following claims.

We claim:

1. An electric motor for actuating at least one functional unit of a motor vehicle, of the type including a motor unit comprising:

at least one plastics material portion;

a two part casing for receiving at least one electronic circuit card having a connection portion, the casing being formed of two complementary portions and having means to receive said card and complementary means to secure said complementary portions together; and one of said portions of the casing being integrally formed with the plastics material portion of the motor unit and the other said portion including an envelope, the connection portion of the circuit card being adapted to project into the envelope for connecting the motor to selected circuits of the vehicle.

2. The motor according to claim 1, wherein said means for receiving said electronic circuit card include slides.

3. The motor according to claim 1, wherein the complementary fixing means of the casing portions comprise spring clip fasteners.

4. The motor according to claim 1, wherein the complementary fixing means of the casing portions comprise screws.

5. The motor according to claim 1, including a seal provided between the two portions of the casing.

6. The motor according to claim 1, including a seal positioned to seal an interface between the circuit card connection portion and said envelope.

7. An electric motor device for use in a vehicle to power at least one functional unit supported on the vehicle, comprising:

a motor housing having at least one portion made from a plastic material having a connecting interface;

a casing portion made from a plastic material having first and second side walls that are generally parallel to each other and a third side wall that extends between said first and second side walls, said first and second sides walls each including one edge that abuttingly engages said connecting interface, said first and second side walls being at an angle relative to a plane defined by said third side wall, said casing portion having a circuit board support structure for supporting a circuit board within said casing portion that includes at least one slot for receiving one edge of a circuit board; and connectors for selectively connecting said casing portion to the plastic material portion of said motor housing.

8. The device of claim 7 including a gasket interposed between said first and second side wall edges and said connecting interface.

9. The device of claim 7, wherein the connectors include tabs integrally formed with said casing portion and corresponding tab-engaging surfaces on said plastic portion of said housing.

10. The device of claim 7, wherein the connectors include threaded members for securing said casing portion to said housing.

11. The device of claim 7, including an envelope extending from one side of said casing portion and having an opening for facilitating a connection between a circuit board supported within said casing portion and a selected functional unit.

12. The device of claim 11, including a seal interposed between a connector portion of the circuit board and an internal surface on said envelope.

13. The device of claim 12, wherein said circuit board support positions a circuit board within said casing portion so that the circuit board is aligned generally parallel with said first and second side walls.

14. An electric motor device for use in a vehicle to power at least one functional unit supported on the vehicle, comprising:

a motor housing having a least one portion with a connecting interface;

a casing portion having first and second sidewalls that are generally parallel to each other and a third sidewall that extends between said first and second sidewalls, said first and second sidewalls each including one edge that engages said connecting interface, said first and second sidewalls being at an angle relative to said third sidewall, said casing portion having a circuit board support structure for supporting a circuit board within said casing portion such that the circuit is aligned generally parallel with said first and second sidewalls; and a connector for selectively connecting said casing portion to said at least one portion of the motor housing.

15. The device of claim 14, including an envelope extending from one side of said casing portion and having an opening for facilitating a connection between a circuit board supported within said casing portion and a selected functional unit.

16. The device of claim 15, wherein the circuit board has a connection portion adapted to project into the envelope of the casing portion.

17. The device of claim 14, wherein the circuit board support structure includes at least one slot for receiving one edge of a circuit board.

\* \* \* \* \*